United States Patent [19]

Bakos

[11] 3,857,724

[45] Dec. 31, 1974

[54] PRIMER FOR ELECTROLESS PLATING

[75] Inventor: Peter Bakos, Wappingers Falls, N.Y.

[73] Assignee: International Business Machines Corporation, Armonk, N.Y.

[22] Filed: Mar. 16, 1973

[21] Appl. No.: 342,015

Related U.S. Application Data

[63] Continuation of Ser. No. 173,621, Aug. 20, 1971, abandoned.

[52] U.S. Cl. .............. 117/47 A, 117/50, 117/71 M, 117/123 B, 117/130 E, 117/138.8 R, 117/160 R

[51] Int. Cl. .............................................. B44d 5/00

[58] Field of Search .. 117/47 A, 50, 71 M, 138.8 R, 117/160 R, 130 E, 47 R, 123 B

[56] References Cited

UNITED STATES PATENTS

| | | | |
|---|---|---|---|
| 3,265,526 | 8/1966 | Beer | 117/50 |
| 3,561,995 | 2/1971 | Wu et al. | 117/47 A |
| 3,674,550 | 6/1972 | Mallory | 117/213 |
| 3,681,257 | 8/1972 | Levy | 117/47 A |
| 3,697,296 | 10/1972 | Bellis | 117/47 A |

*Primary Examiner*—John D. Welsh
*Assistant Examiner*—Bruce H. Hess
*Attorney, Agent, or Firm*—David M. Bunnell

[57] ABSTRACT

A primer formulation for the activation of surfaces prior to electroless plating comprises a solution of acid gold chloride, stabilizer, and inhibitor in an organic solvent.

6 Claims, No Drawings

PRIMER FOR ELECTROLESS PLATING

CROSS-REFERENCE TO RELATED APPLICATION

This application is a continuation of copending application Ser. No. 173,621, filed Aug. 20, 1971 and now abandoned.

BACKGROUND OF THE INVENTION

This invention relates generally to plating and more particularly to an activator solution for electroless or chemical plating.

In the electroless plating of metal films such as, for example, copper and nickel it is conventional to treat the surface to be plated with a primer or activator solution. The primer forms a deposit on the surface which acts to catalyze and/or accelerate the depositing of the metal film on the surface and cause it to form a continuous and adherent layer.

In the past it has been found that even when a primer is employed, some surfaces, particularly those which are very smooth, are difficult to plate with a coating which has any adherence under thermal or mechanical stress.

A primer solution has now been found which produces superior results with respect to adhesion of the electroless deposit, which remains stable for long periods of time during storage and use, and which acts to stabilize the electroless plating bath.

BRIEF SUMMARY OF THE INVENTION

In accordance with this invention there is provided a primer for electroless deposition comprising an organic solvent solution of a gold or platinum salt and an inhibitor. A stabilizer can be included in the solution which acts to increase the storage life of the primer. The inhibitor acts to increase the useful life of the electroless plating bath with which the primer is employed.

The surface to be plated, which can be either metallic or non-metallic, is coated with the primer solution, the solvent evaporates to leave a deposit of activator and inhibitor on the surface, and the surface is them immersed in an electroless plating solution for a sufficient period of time to build up the desired layer thickness.

DETAILED DESCRIPTION

The primer solution of the invention can be used to impart surface activity for subsequent electroless plating to both metallic and non-metallic surfaces, for example, chromium, aluminum, molybdenum, vanadium, tungsten, copper, nickel, silver, gold, ceramics and organic polymer material. It has been found to be particularly useful in the electroless plating of conductive materials such as copper, onto chrominum when forming the conductive metallurgy for microminiaturized electronic circuit packages. The primer treatment results in strong bonding between the base metallurgy and the deposited coating which has not heretofore been achieved by the use of known surface treatments. Adherent coatings have been obtained when bonding plated metal layers to smooth substrates having a surface roughness of less than five micro-inches where previous treatments have failed to provide a coating having any significant adhesion at all.

The activator metal in the primer is employed in the form of an organic solvent soluble salt, preferably acid gold chloride, in an amount by weight of solution from about 0.001 to 2.0 per cent. A preferred range is from about 0.01 to 0.20 per cent by weight of solution which has been found to be sufficient to form the required activating microdeposit on the substrate. It has also been found that platinum salts such as chloroplatinic acid are operable but the use of a platinum compound is not perferred from an economic standpoint.

The activator solution is substantially nonaqueous and employs organic solvents or mixtures thereof. Suitable solvents are those which have sufficient solubility to obtain the desired concentration of the metal salts and which are low boiling so that they will evaporate rapidly upon applying the primer solution to the surface. Such solvents include, for example, low boiling alcohols such as methanol, ethanol, propanol, butanol, cyclohexanol, ketones such as cyclohexanone, and non-halogenated hydrocarbons. The preferred solvents are alcohols and mixtures thereof.

A small amount of inhibitor which is an organic or an inorganic sulfur containing compound is added to the primer solution. The inhibitor is deposited along with the gold salt upon the surface to be coated, and acts to stabilize the electroless coating solution and prevent the precipitation of any non-adherent metal onto the substrate during the plating process. Examples of suitable inhibitors include both inorganic sulfur compounds such as alkali metal thiocyanates, for example, sodium and potassium thiocyanates; sodium sulphate; alkali metal thiosulphates; and organic sulfur containing compounds, for example, 8 -mercaptopurine; organic acids, for example, thiodiglycolic acid, thiomalic acid, thiocarbanates, for example, thiourea; thiazoles; thiazines and mixtures of the above.

The inhibitor is employed in amounts of from about 0.00005 to about 0.05 per cent by weight of solution with a preferred range of about 0.0001 to 0.04 per cent.

The organic solvent system, as opposed to an aqueous system, not only provides for rapid drying of the primer on the substrate but also provides a solution having an improved storage life. If desired, a stabilizer is added to further increase the useful life of the primer solution. Suitable stabilizers are, for example, low boiling acetate esters such as n-butylacetate. The stabilizers are employed in the amounts of from about 0 to 15 per cent by volume.

The general composition of the primer is from about 0 to 15 per cent by volume stabilizer, from about 0.001 to 2.0 per cent by weight of solution of metal salt, from about 0.00005 to about 0.05 per cent by weight of solution of inhibitor and the remainder solvent. The ranges shown are not particularly critical and are chosen from a practical standpoint.

The electroless metal plating solutions which are useful with the primers of the invention are well known to those skilled in the art. These solutions generally comprise a metal salt of, for example, copper or nickel, a reducing agent, PH adjusters, and, optionally, stabilizers and complexing agents.

The invention is further illustrated by, but is not intended to be limited to the following examples wherein parts are parts by weight unless otherwise indicated.

EXAMPLE 1

A thin layer of chromium was deposited on four kinds of one inch square flat ceramic substrates having different surface roughness measured in micro-inches as shown in Table I, Samples I–IV. The surfaces were activated for electroless copper deposition by spin coating different samples of the chromium coated ceramic substrates with each of the following solutions:

| | |
|---|---|
| **Solution A** | |
| Methanol | 95 ml |
| Butylacetate | 5 ml |
| $HAuCl_4.3H_2O$ | 0.1 gram |
| NaSCN | 0.001 gram |
| **Solution B** | |
| Methanol | 95 ml |
| Butylacetate | 5 ml |
| $HAuCl_4.3H_2O$ | 0.1 gram |
| Thiodiglycolic acid | 0.001 gram |
| **Solution C1 and C2** | |
| Cl — $SnCl_2$ | 40 grams per/liter aqueous HCl |
| C2 — $PdCl_2$ | 1 gram per/liter aqueous HCl |

The substrates were spin coated at an rpm of about 1500 for 30 seconds to coat them with the primer solutions. (Except solution C, where the conventional wet process was used) The dried substrates were then placed in a conventional electroless copper plating bath comprising copper sulphate, formaldehyde, sodium carbonate, Rochelle salt, nickel chloride, and sodium hydroxide at a PH of about 9 for about 30 minutes to plate a copper coating of about 0.5 millionths of an inch thick. The thickness of the coating was then built up by electroplating the samples in a conventional copper sulphate plating bath for a period of about 30 minutes in order to build up a layer of about 250 microinches in thickness. Plated samples of each type of substrate which were treated with each primer solution were placed in an oven at 700°C. in an inert nitrogen atmosphere for 45 minutes. The plated copper layer on the samples which were prime coated with the primers of formulas A and B remained intact. However the samples which were primer coated with the primer solutions C1 and C2 in accordance with the previously known procedure blistered badly.

Samples of each type substrate and primer were masked by photoresist during the electroplating step to form a pattern of small metal pads such as are employed for joining semiconductor chips to a ceramic structure. Dummy semiconductor chips were adhered to the pads, which had a total area in each case of about 0.0006 square inch and a metal rod was attached to each chip with adhesive. A brass slug was affixed to the other end of the rod for attaching the rod to an Instron tensile tester. The tensile strength, in grams, to rupture the bond between the chrome-copper interface was determined for each sample with the results listed in Table I below.

Table I

| Ceramic Substrate | Surface Roughness in Micro-inches | Undercoat | Tensile Strengths/Grams Primer A | Primer B | Primer C |
|---|---|---|---|---|---|
| I | 27 | Chromium | 650 | 1190 | 505 |
| II | 28 | Chromium | 740 | 1175 | 410 |
| III | 13 | Chromium | 550 | 960 | 325 |
| IV | 8 | Chromium | 600 | 810 | 270 |

It can be seen that, in general, the adhesion decreased with the increasing smoothness of the substrate but in all cases the values of the tensile strength for the copper deposit on chrominum, using the primers of the invention, was significantly higher than the copper deposited using the primer treatment of the prior art (solutions C1 and C2).

EXAMPLES 2–6

The process of Example 1 was repeated using primer formulations having the following compositions to adhere copper to a chromium layer.

| | |
|---|---|
| **Example 2** | |
| Methyl alcohol ($CH_3OH$) | 92 ml |
| N-Butyl acetate ($CH_3CH_2CH_2CH_2COOCH_3$) | 8 ml |
| Acid Gold Chloride ($HAuCl_4.3H_2O$ | .10 g |
| 8-Mercaptopurine ($C_5H_4N_4S$) | .01 g |
| **Example 3** | |
| Methyl alcohol ($CH_3OH$) | 92 ml |
| N-Butylacetate ($CH_3CH_2CH_2CH_2COOCH_3$) | 8 ml |
| Acid Gold Chloride ($HAuCl_4.3H_2O$) | .10 g |
| Sodium thiocyanate (NaSCN) | .01 g |
| **Example 4** | |
| Methyl alcohol ($CH_3OH$) | 92 ml |
| N-Butylacetate ($CH_3CH_2CH_2CH_2COOCH_3$) | 8 ml |
| Acid Gold Chloride ($HAuCl_4.3H_2O$) | .10 g |
| Thiodiglycolic acid [$S(CH_2COOH)_2$] | .01 g |
| **Example 5** | |
| Methyl alcohol ($CH_3OH$) | 92 ml |
| N-Butylacetate ($CH_3CH_2CH_2CH_2COOCH_3$) | 8 ml |
| Acid Gold chloride ($HAuCl_4.3H_2O$) | .10 g |
| Sodium thiocyanate (NaSCN) | .005 g |
| Thidiglycolic acid [$S(CH_2COOH)_2$] | .01 g |
| **Example 6** | |
| Methyl alcohol ($CH_3OH$) | 52 ml |
| Ethyl alcohol ($C_2H_5OH$) | 40 ml |
| Acid gold chloride ($HAuCl_4.3H_2O$) | .10 g |
| Sodiumthiocyanate (NaSCN) | .01 g |

In each case the adhesion of the plated copper coatings was excellent.

EXAMPLE 7

The primer of Example 2 was employed to activate a chrome surface for electroless nickel deposition. A conventional electroless nickel plating bath was employed comprising nickel chloride, ammonium chloride, sodium hydrophosphate, and sodium hydroxide. A coating of electroplated nickel was plated on top of the electroless film. The resulting nickel film had good adhesion to the chromium surface.

EXAMPLE 8

The primer of Example 1 solution B was used to activate a ceramic surface for copper plating which surface was extremely smooth having a surface roughness of less than 5 microinches. A tensile test was conducted as in Example 1 and the copper layer had an adhesion of about 170 grams. In contrast, a copper coating on the same smooth surface which was activated using a conventional primer solutions C1 and C2 of Example 1, produced a coating having little or no adhesion with an adherence of 35 grams or less.

EXAMPLE 9

The primer solution of Example I, solution B was used to activate a molybdenum surface for copper plating in accordance with the procedure of Example 1 and excellent adhesion between the copper and molybdenum was attained.

Good results were also obtained when Example 9 was repeated using the primers of the invention to adhere electroless coatings to aluminum, tungsten and directly onto samples of the ceramic substrates I–IV of Table I which were not chromium coated.

While the invention has been particularly shown and described with reference to preferred embodiments thereof it will be understood by those skilled in the art that various changes in form and details may be made therein without departing from the spirit and scope of the invention.

I claim:

1. A process for forming an adherent metal coating on a surface comprising:

contacting said surface with a substantially non-aqueous organic solvent solution consisting essentially of from about 0.001 to 2.0 percent by weight of solution of a gold or platinum salt selected from the group consisting of acid gold chloride and chloroplatonic acid and from about 0.00005 to about 0.05 percent by weight of solution of an inhibitor for an electroless plating solution which inhibitor is an inorganic or organic sulfur compound selected from the group consisting of alkali metal thiocyanates, sodium sulphate, alkali metal thiosulphates, 8-mercaptopurine, thiodiglycolic acid, thiomalic acid, thiocarbanates, thiazolines, thiazines an mixtures thereof, said solvent being selected from the group consisting of low boiling alcohols, ketones, and non-halogenated hydrocarbons, removing said solvent to leave a deposit of said salt and said inhibitor on said surface, and contacting said surface with a copper or nickel electroless metal plating solution to form said coating on said surface.

2. The process of claim 1 wherein said solution includes up to about 15 percent by volume of a low boiling liquid acetate ester as a stabilizer.

3. The process of claim 2 wherein said salt is acid gold chloride said stabilizer is butyl acetate, said solvent is methanol and said inhibitor is thiodiglycolic acid.

4. The process of claim 2 wherein said salt is acid gold chloride, said inhibitor is sodium thiocyanate and said solvent is a mixture of methyl alcohol and ethyl alcohol.

5. The process of claim 1 wherein said surface is a ceramic material.

6. The process of claim 1 wherein said surface is chrome.

* * * * *